(12) United States Patent
He et al.

(10) Patent No.: US 12,743,868 B2
(45) Date of Patent: Sep. 22, 2026

(54) SYSTEMS AND METHODS FOR SIMILARITY-BASED UNIVERSAL OBJECT-DETECTION FOR JOINT IDENTIFICATION

(71) Applicant: PAYPAL, INC., San Jose, CA (US)

(72) Inventors: Jiawei He, Shanghai (CN); Yao Chen, Shanghai (CN)

(73) Assignee: PayPal, Inc., San Jose, CA (US)

( * ) Notice: Subject to any disclaimer, the term of this patent is extended or adjusted under 35 U.S.C. 154(b) by 294 days.

(21) Appl. No.: 18/292,551

(22) PCT Filed: Jun. 8, 2023

(86) PCT No.: PCT/CN2023/099125
§ 371 (c)(1),
(2) Date: Jan. 26, 2024

(87) PCT Pub. No.: WO2024/250230
PCT Pub. Date: Dec. 12, 2024

(65) Prior Publication Data

US 2025/0225767 A1 Jul. 10, 2025

(51) Int. Cl.
*G06V 10/764* (2022.01)
*G06V 10/74* (2022.01)

(52) U.S. Cl.
CPC .......... *G06V 10/764* (2022.01); *G06V 10/761* (2022.01); *G06V 2201/09* (2022.01)

(58) Field of Classification Search
CPC ............... G06V 10/764; G06V 10/761; G06V 2201/09; G06V 10/82
See application file for complete search history.

(56) References Cited

U.S. PATENT DOCUMENTS 11,093,497 B1 * 8/2021 Gupta ................. G06F 16/2343
2018/0247154 A1 8/2018 Kitamura
(Continued)

FOREIGN PATENT DOCUMENTS

CN 104679863 A 6/2015
CN 105160292 A 12/2015
(Continued)

OTHER PUBLICATIONS

Cnipa, Search Report and Written Opinion issued in appl. No. PCT/CN2023/099125, date of mailing Dec. 27, 2023, 7 pgs.

*Primary Examiner* — Bobbak Safaipour
(74) *Attorney, Agent, or Firm* — Greenberg Traurig, LLP

(57) ABSTRACT

A computer-implemented method may include receiving an image to analyze for potential objects; providing the image as input to a pretrained machine learning model, where the pretrained machine learning model is trained to detect a known object that corresponds to a predefined category within the pretrained machine learning model or a generic object; determining based on output from the pretrained machine learning model, that the image comprises an instance of a generic object; performing, based on determining that the image comprises an instance of a generic object, a similarity search between the image and a library of images; and determining, for the instance of the generic object, a specific category defined by the library of images based at least in part on the similarity search. Various other methods and systems are also disclosed.

19 Claims, 8 Drawing Sheets

(56) References Cited

U.S. PATENT DOCUMENTS

| | | | | |
|---|---|---|---|---|
| 2019/0278894 | A1* | 9/2019 | Andalo | G06F 21/32 |
| 2019/0325267 | A1* | 10/2019 | Chen | G06N 3/08 |
| 2020/0356818 | A1* | 11/2020 | Attorre | G06V 10/764 |
| 2021/0165823 | A1* | 6/2021 | Zhang | G06Q 20/4093 |
| 2023/0401386 | A1* | 12/2023 | Wang | G06F 16/35 |
| 2024/0013055 | A1* | 1/2024 | Liu | G06N 3/096 |
| 2026/0004585 | A1* | 1/2026 | Hosseini | G06V 10/267 |

FOREIGN PATENT DOCUMENTS

| | | | |
|---|---|---|---|
| CN | 107392221 | A | 11/2017 |
| CN | 113743443 | A | 12/2021 |

* cited by examiner

Add the logo of Blueberry Tau into Logo Library

602

604

Label: Blueberry

Add to library

606

BatBall

Method 700

Start

Receive an image to analyze for potential symbols
710

Provide the image as input to a pretrained machine learning model
720

Determine, based on output from the pretrained machine learning model, that the image includes an instance of a generic symbol
730

SYSTEMS AND METHODS FOR SIMILARITY-BASED UNIVERSAL OBJECT-DETECTION FOR JOINT IDENTIFICATION

BACKGROUND

Object detection in images is a critical task in many applications. In recent years, significant advancements in machine learning have led to the development of various object detection algorithms. These algorithms may attempt to locate or identify objects within images.

BRIEF DESCRIPTION OF THE DRAWINGS

The accompanying drawings illustrate a number of exemplary embodiments and are a part of the specification. Together with the following description, these drawings demonstrate and explain various principles of the present disclosure.

Figure 1:
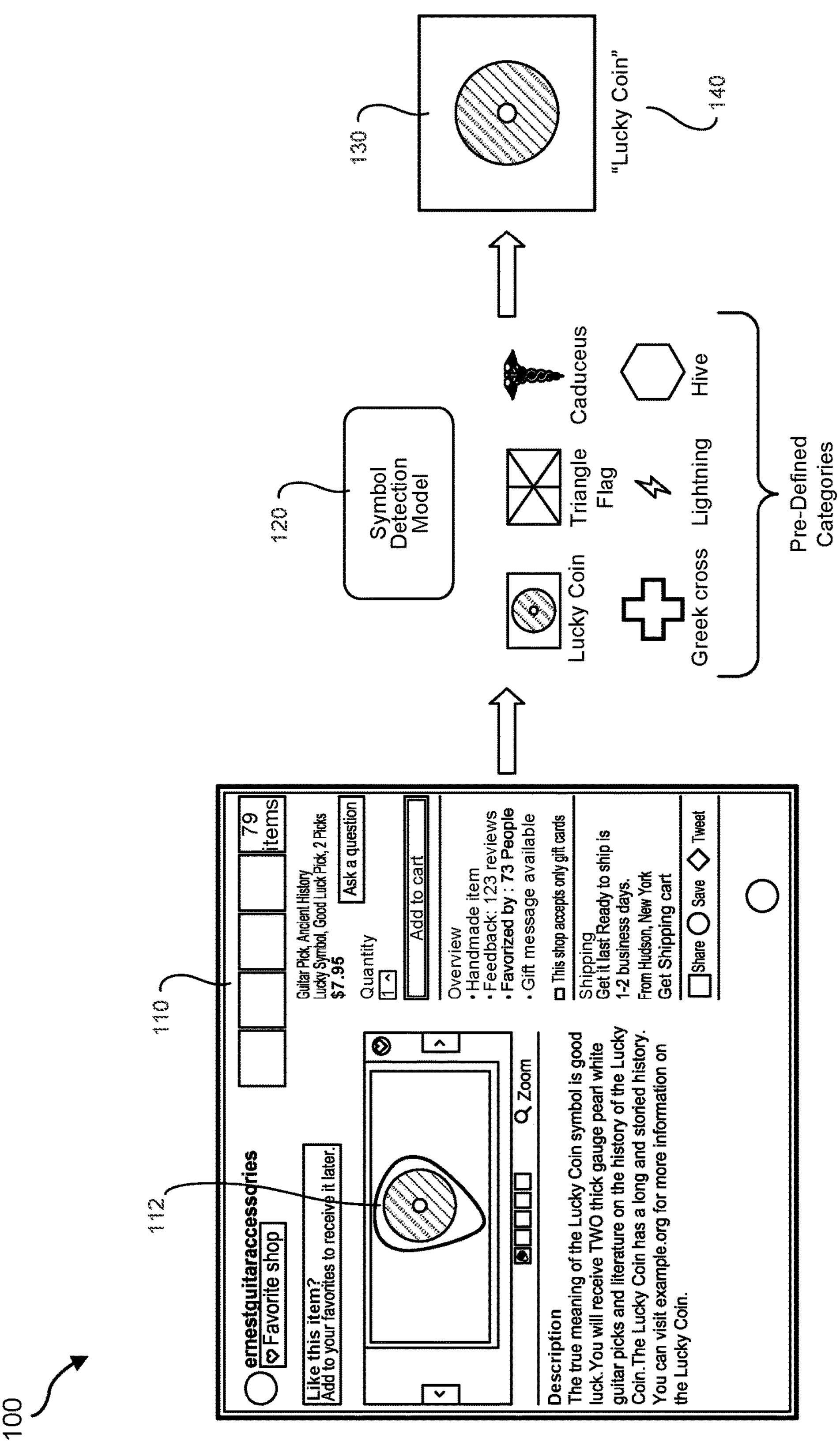
FIG. 1 is an illustration of an example use case of an example system for similarity-based objection detection for joint identification.

Throughout the drawings, identical reference characters and descriptions indicate similar, but not necessarily identical, elements. While the exemplary embodiments described herein are susceptible to various modifications and alternative forms, specific embodiments have been shown by way of example in the drawings and will be described in detail herein. However, the exemplary embodiments described herein are not intended to be limited to the particular forms disclosed. Rather, the present disclosure covers all modifications, equivalents, and alternatives falling within the scope of the appended claims.

DETAILED DESCRIPTION OF EXEMPLARY EMBODIMENTS

The present disclosure is generally directed to systems and methods for similarity-based universal object detection for joint identification. Some approaches to object detection may suffer from various limitations, including the expense and difficulty in preparing a robust data set, difficulties with detecting new categories of objects (i.e., objects that didn't exist or were little known when the original data set was prepared), and the difficulty and expense associated with human involvement in training an object detection model. The systems and methods described herein may provide end-to-end similarity-based open-set object detection. Thus, for example, these systems and methods may support detecting new categories of objects without re-training the entire detection model. Furthermore, these systems and methods may support detection of new categories without highly specialized human skill and without a large amount of time and computational resources in re-training, evaluating, and deploying a new model.

In some examples, these systems and methods may train a system for detecting objects. For example, these systems and methods may train an object detector (both to identify specific categories of objects and a general category of objects). In addition, these systems and methods may train a task-specific feature extractor. Furthermore, these systems and methods may build a similarity search index for a gallery of images. In some examples, these systems and methods may also build a text library for text that corresponds to specific categories. Additionally, these systems and methods may calculate category-specific thresholds that determine the bounds within a feature space for classifying an object within a specific category.

In addition, in some examples, these systems and methods may detect and categorize objects in images. For example, an object detector may extract objects of pre-defined categories. The object detector may also extract regions of interest (e.g., for objects without a pre-defined specific category). These systems and methods may provide each such region of interest to a feature extractor (and, in some examples, to an optical character recognition module), thereby converting each region of interest into a feature vector (and, in some examples, a text string). These systems and methods may then find the top k similar vectors from a similarity search index for the region-of-interest feature vectors and fetch their corresponding labels (along with, e.g., matched text from a text library). These systems and methods may then perform a threshold cut-off for each category. Thus, these systems and methods may map matched labels to corresponding regions-of-interest, thereby producing, e.g., labeled bounding boxes that identify categorized objects within an image.

The systems and methods described herein may apply the object detection techniques described herein in any of a variety of contexts. In some examples, these systems and methods may detect logos. In some examples, these systems and methods may, based on detecting a logo in an image, automatically tag and/or classify a source that includes the image as pertaining to a brand based on the logo. Additionally or alternatively, in some examples these systems and methods may determine, based on detecting the logo, that the source potentially violates the intellectual property of the brand. In some examples, these systems and methods may perform a remediation action in response to determining that the source potentially violates the intellectual property, including generating and/or issuing a warning to a person responsible for the potential violation and/or to a moderator and/or removing and/or blocking the source.

In some examples, the systems and methods described herein may apply the object detection techniques described herein in a content moderation context. For example, these systems and methods may detect symbols within an image that constitute and/or indicate inappropriate content. Accordingly, these systems and methods may, based on detecting the symbol constituting inappropriate content, generate and/or issue a warning to a person responsible for a source of the image and/or to a content moderator regarding the inappropriate content. Additionally or alternatively, these systems and methods may remove and/or block the symbol, the image, and/or the source of the image.

The systems and methods described herein may improve the functioning of a computer itself by improving the object detection capabilities of the computer and/or by improving the computational efficiency and/or time efficiency with which the computer detects objects within images. In addition, these systems and methods may improve the functioning of a computer by enabling simple, quick, and/or computationally efficient updates to an object detection system to successfully detect and categorize new objects. In addition, these systems and methods may represent an improvement to the technical fields of image processing and object detection within images.

Features from any of the embodiments described herein may be used in combination with one another in accordance with the general principles described herein. These and other embodiments, features, and advantages will be more fully understood upon reading the following detailed description in conjunction with the accompanying drawings and claims.

FIG. 1 is an illustration of an example system 100 for similarity-based object detection for joint identification. As shown in FIG. 1, a web page 110 may include an image 112. System 100 may provide image 112 to a symbol detection model 120. As used herein, the term "symbol" may refer to any graphic and/or visual representation including, without limitation, a logo, icon, and/or pictogram. In some examples, as used herein, the term "symbol" may refer to a category of similar images (e.g., with the same or similar semantic content). In some examples, as used herein, the term "symbol" may refer to an instance within such a category. Thus, for example, a symbol (in the sense of a category of images) may include many instances, some of which instances may be variations of each other (e.g., the symbol having alternative designs). In some examples, symbols as discussed herein may appear in images including, e.g., photographic images. Thus, for example, symbols as discussed herein may appear on products and/or product packaging, on apparel, on signs, on flags, etc.

While some examples described herein discuss the identification and classification of symbols, the systems and methods described herein may generally apply to any objects shown within images (including, e.g., symbols). As used herein, the term "object" may refer to any distinct, discrete, and/or integral entity shown and/or represented within an image. In some cases, one or more of the systems and methods described herein may identify an instance of an object as a generic object—e.g., as an object as such, without further classification. In some cases, one or more of the systems and methods described herein may identify an instance of an object as specific type, classification, and/or category of an object. Thus, for example, the systems and methods described herein may identify a shoe as an instance of an object (i.e., belonging to the class of generic objects) and/or may identify a shoe as an instance of a shoe (i.e., belonging to the class of shoes, which are, in turn, objects).

Symbol detection model 120 may analyze image 112 for potential symbols. For example, symbol detection model 120 may analyze image 112 for one or more known symbols (e.g., symbols included in the training of symbol detection model 120) from pre-defined categories 122. As used herein, the term "category" as it relates to symbols may generally refer to a classification of variations of a symbol. Thus, for example, pre-defined categories 122 may include the caduceus symbol. There may be many possible variations of the caduceus symbol, although most variations may include some key visual features such as a central straight rod, two intertwined serpents wrapped around the rod in a helical pattern, and wings at the top of the rod. In some examples, the systems and methods described herein may determine features of a symbol by a trained machine learning model and/or by a feature extraction module.

In one example, web page 110 may include an image 112 of a guitar pick with a "lucky coin" symbol 130 on it. As the lucky coin symbol may be within pre-defined categories 122, symbol detection model 120 may return a label 140. System 100 may thus associate label 140 with image 112 (and/or a bounding box describing a location within image 112) and/or web page 110.

Figure 2:
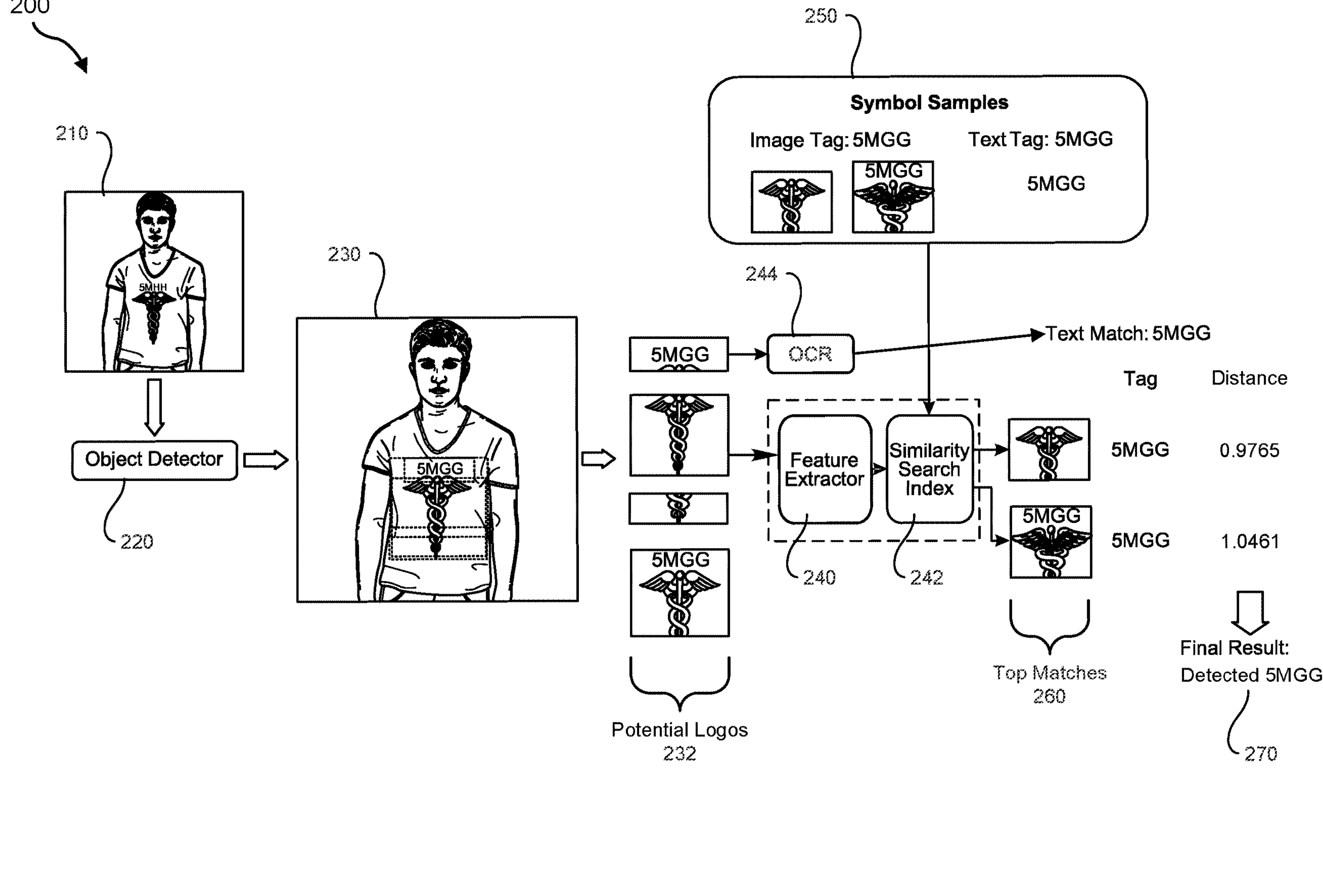
FIG. 2 is an illustration of an example symbol detection task.

FIG. 2 is an illustration of an example symbol detection system 200. As shown in FIG. 2, system 200 may include an object detector 220. In one example, object detector 220 may receive an image 210 as input. In some examples, object detector 220 may be trained to identify objects and/or specific types of objects (e.g., symbols) within images. Thus, in one example, object detector may generate a set of bounding boxes 230 over image 210 that define the locations of potential logos 232 within image 210.

In some examples, object detector 220 may include a symbol detection model, e.g., similar to symbol detection model 120 of FIG. 1. However, in the example shown in FIG. 2, the model may not have been trained on the caduceus symbol. Nevertheless, object detector 220 may detect the caduceus (or parts thereof) as a generic symbol.

Having detected potential logos 232 as generic symbols, system 200 may attempt to match the various detected potential logos 232 with candidate match symbols within a library of images 250. In some examples, library of images 250 may include images of symbols that are not included in one or more pre-defined categories of symbols that object detector is configured to identify. For example, library of images 250 may include images of symbols that a machine learning model (as a part of and/or in communication with object detector 220) has not been trained on. Thus, library of images 250 may provide a way to add symbol detection capabilities to system 200 in an live fashion (e.g., without requiring retraining a machine learning model associated with object detector 220, which could be computationally expensive, involve the involvement of highly skilled technical specialists, and/or could take a large amount of time).

To determine whether any of potential logos 232 match any symbols in library of images 250, system 200 may provide each of potential logos 232 to a feature extractor 240. In some examples, feature extractor 240 may be a task-specific feature extractor configured to extract features from images of symbols. System 200 (and/or a system in communication with system 200) may have previously extracted features of images stored in library of images 250.

After extracting features from each of potential logos 232, system 200 may perform a similarity search between the extracted features from potential logos 232 and the extracted features from the images in the library of images. For example, system 200 may use a similarity search index 242. Similarity search index 242 may include one or more data structures and/or modules that organizes and/or optimizes feature vectors for fast and efficient similarity queries.

In addition to submitting potential logos 232 to feature extractor 240, system 200 may provide detected logos 232 as input to an optical character recognition (OCR) module 244. OCR module 244 may identify text strings within potential logos 232. In some examples, library of images 250 may also include text tags associated with categories of images. Thus, for example, the text tag "5MGG" may be associated with a category of images that includes logos of the caduceus (some of which may include the text "5MGG").

Based on the results of the similarity search index 242, system 200 may identify top matches 260 from library of images 250. System 200 may then, based on top matches 260, categorize one or more of detected logos 232. For example, system 200 may select the top match (with a distance of 0.9765) with a tag of "5MGG" and thereby determine that one of detected logos 232 is a "5MGG" logo. In some examples, system 200 may determine that one of detected logos 232 is a "5MGG" logo based on a plurality (e.g., a majority) of top matches 260 having the same tag ("5MGG"). In addition, in some examples system 200 may further determine a match between a category defined in library of images 250 and one or more of detected logos 232 based on a text match between one or more of detected logos 232 and a text tag associated with a category in library of images 250.

Having matched one of detected logos 232 with the "5MGG" category defined in library of images 250, system 200 may provide the "5MGG" categorization as output. In some examples, system 200 may annotate image 210 with a bounding box (as provided by object detector 220) of the matching logo from detected logos 232 and/or the tag "5MGG." In addition, in some examples system 200 and/or a system in communication with system 200 may tag a source of the image with the categorization "5MGG." In one example, the symbol category "5MGG" may be subject to content restriction and/or moderation, and system 200 and/or an adjacent system may take a remediation action in response to determining that image 210 includes a symbol of the category "5MGG." In some examples, the "5MGG" symbol may be a relatively new symbol (e.g., introduced and/or popularized after the training of object detector 220) and system 200 may nevertheless efficiently detect the "5MGG" symbol as a final result 270.

Figure 3:
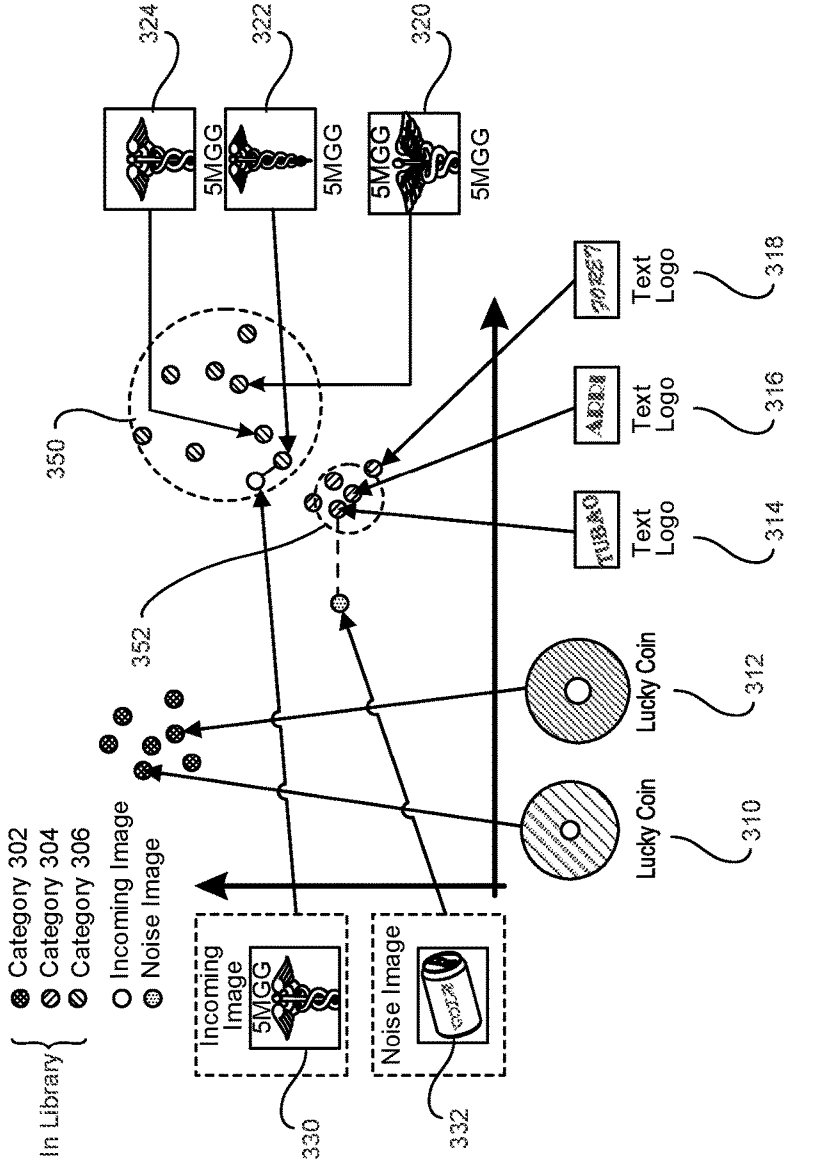
FIG. 3 is an illustration of an example symbol feature space.
Figure 3:
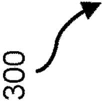
Figure 4A:
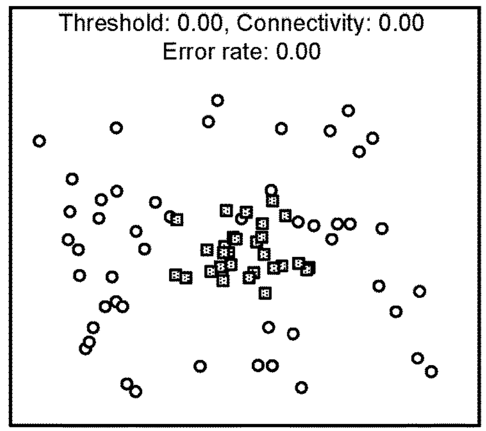
FIGS. 4A, 4B, 4C, 4D, 4E, and 4F are illustrations of a graph-connectivity-based approach for setting a category-specific threshold.
Figure 4D:
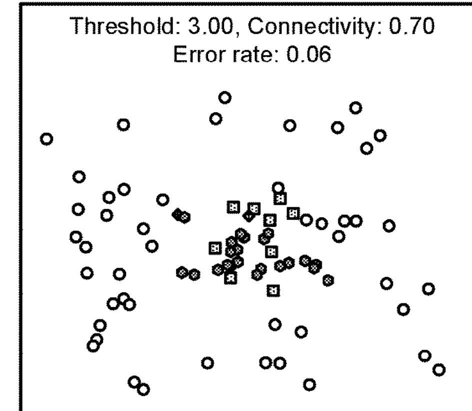
Figure 4B:
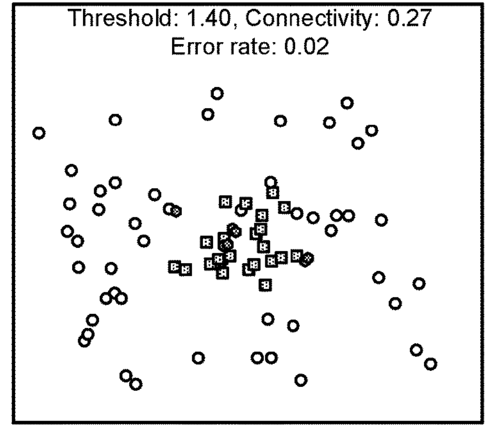
Figure 4E:
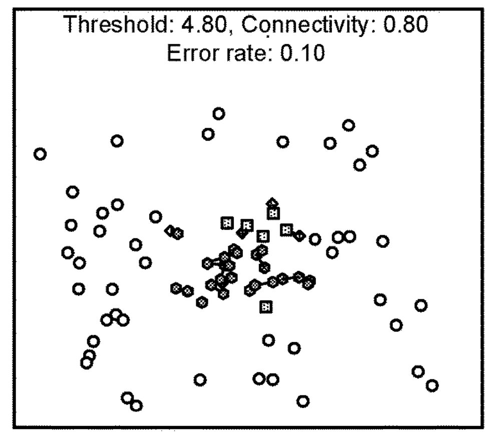
Figure 4C:
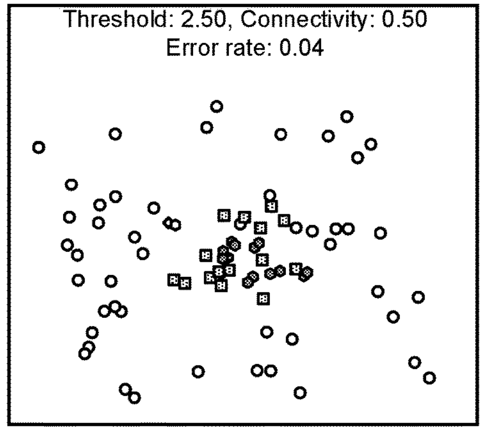
Figure 4F:
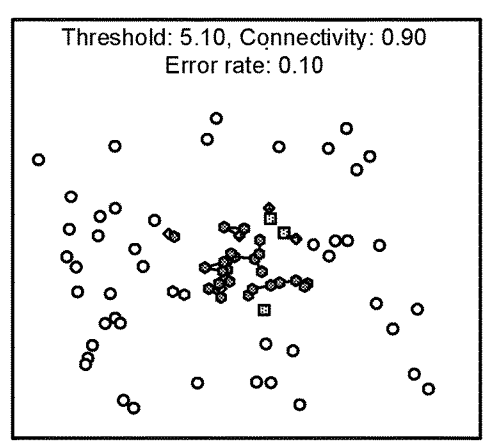

FIG. 3 is an illustration of an example symbol feature space 300. As mentioned earlier, systems and methods described herein may represent the features of an image of a symbol as a multi-dimensional vector. While feature space 300 is shown in FIG. 3 as a two-dimensional space, it may be appreciated that the feature vectors of a symbol may have many more dimensions (e.g., thousands or more).

In one example, feature space 300 as shown in FIG. 3 may illustrate feature vectors of images from a library of images, such as library of images 250 of FIG. 2. Thus, for example, a symbol category 302 ("Lucky Coin") may include symbol images 310 and 312, a symbol category 304 ("Text Logo") may include symbol images 314, 316, and 318, and a symbol category 306 ("5MGG") may include symbol images 320, 322, and 324. Feature space 300 may also include an uncategorized noise image 332. When performing a similarity search (e.g., with an incoming image 330), the systems and methods described herein may determine whether or not the incoming image matches the category based at least in part on whether the incoming image falls within a similarity threshold for the category. However, different symbols may have different degrees of variance among the features of their instances. Thus, the systems and methods described herein may determine and/or utilize different similarity thresholds for different categories. By way of example, as shown in FIG. 3, category 306 may have a similarity threshold 350 and category 304 may have a similarity threshold 352.

The systems and methods described herein may use any of a variety of techniques to automatically set thresholds for categories. FIGS. 4A-4F are illustrations of a graph-connectivity-based approach for setting a category-specific threshold for a category defined in a library of images.

The graph-connectivity based approach may involve the systems and methods described herein selecting a threshold that best meets a connectivity metric. The connectivity metric may involve constructing a connected graph for a specific category and measuring how many nodes in the graph belong to the specific category (and so are correctly connected) and how many nodes do not belong to the specific category (and so are incorrectly connected). The systems and methods described herein may thus select a threshold that maximizes the connectivity metric (or, at least, preferentially select a threshold resulting in a greater connectivity metric than a threshold resulting in a lower connectivity metric all other factors being equal). For example, these systems and methods may select the first threshold that meets a minimum target for the connectivity metric.

In one example, a graph-connectivity-based method may include (as a Step 1) selecting a candidate category-specific threshold $t_c$. The systems described herein may choose an initial threshold in any suitable manner, including, e.g., pseudorandomly and/or at a fixed starting threshold. In some examples, these systems may start from a low initial threshold (e.g., at or near zero) and increase the threshold in increments. In some examples, the threshold may be a number from 0 to a maximum threshold.

The graph-connectivity based method may then include (as a Step 2) treating all images in the library of images as a graph G, and marking the subset of images in G belonging to the category c as a subgraph $G_c$.

The graph-connectivity method may then include (as a Step 3), calculating the similarity distance between any two images nodes in graph G. For example, for any two image nodes $\sigma_j$, $\sigma_j$ in G, these systems may calculate the similarity distance $d_{\sigma_i,\sigma_j}$, $i \neq j$.

The graph-connectivity method may then include (as a Step 4), calculating the graph connectivity for the graph $G_c$. Step 4 may include multiple sub-steps. First, (as a Step 4a), the graph-connectivity method may instantiate, for the node set $V_c$, one or more subsets, including, e.g., a connected node set $V-\text{Connected}_c$ and an error node set $V-\text{Error}_c$. Second, (as a Step 4b), the method may conditionally add an edge between $\sigma_i$, $\sigma_j$ if $d_{\sigma_i,\sigma_j}<t_c$. If $\sigma_i \in G_c$, then the method may add $\sigma_i$ to the set V-$\text{Connected}_c$. Otherwise, the method may add $\sigma_i$ to the set $V-\text{Error}_c$.

Third, (as a Step 4b), the method may calculate the graph connectivity $G_c$ as a proportion of the nodes in the category that are connected, according to Equation (1):

$$\text{Connectivity}(G_c, t_c) = \frac{|V - \text{Connected}_c|}{|V_c|} \tag{1}$$

In addition, the method may calculate the connectivity error of G, according to Equation (2):

$$\text{Error}(G_c, t_c) = \frac{|V - \text{Error}_c|}{|V_c|} \tag{2}$$

The graph-connectivity method may then include (as a Step 5), repeating Steps 1-4 until $\text{Connectivity}(G_c, t_c) > \text{TargetConnectivity}$, at which point $t_c$ represents the category-specific similarity threshold.

Using FIGS. 4A-4F for illustration, FIGS. 4A-4F may show feature vectors for images in an image library as nodes in a feature space. While the feature space shown in FIGS. 4A-4F may be represented in two-dimensions, it may be appreciated that the feature space may be a high-dimensional space. The nodes shown in FIGS. 4A-4F may include nodes that are images in the image library, including nodes that are in the target category, nodes that are out of the target category, nodes that are connected (e.g., those nodes added to V–Connected$_c$), and nodes that are in error (e.g., those nodes added to V-Error$_c$). In one example, the target connectivity may be 0.9 (e.g., 90% of all nodes in the category being connected). Thus, the systems and methods described herein may start with a candidate threshold of 0 in FIG. 4A, resulting in Connectivity($G_c$, $t_c$)=0 and Error($G_c$, $t_c$)=0. Because the candidate threshold doesn't achieve the minimum connectivity, these systems and methods may iterate the process again with a candidate threshold of 1.4 in FIG. 4B, resulting in Connectivity($G_c$, $t_c$)=0.27 and Error($G_c$, $t_c$)=0.02. Because the candidate threshold doesn't achieve the minimum connectivity, these systems and methods may iterate the process again with a candidate threshold of 2.5 in FIG. 4C, resulting in Connectivity($G_c$, $t_c$)=0.5 and Error($G_c$, $t_c$)=0.04. Because the candidate threshold still doesn't achieve the minimum connectivity, these systems and methods may iterate the process again with a candidate threshold of 3 in FIG. 4D, resulting in Connectivity($G_c$,$t_c$)=0.7 and Error($G_c$, $t_c$)=0.06. Because the candidate threshold doesn't achieve the minimum connectivity, these systems and methods may iterate the process again with a candidate threshold of 4.8 in FIG. 4E, resulting in Connectivity($G_c$, $t_c$)=0.8 and Error($G_c$, $t_c$)=0.1. Because the candidate threshold doesn't achieve the minimum connectivity, these systems and methods may iterate the process again with a candidate threshold of 5.1 in FIG. 4F, resulting in Connectivity($G_c$, $t_c$)=0.9 and Error($G_c$, $t_c$)=0.1. Because the candidate threshold 5.1 does meet the minimum connectivity of 0.9, the systems and methods described herein may select 5.1 as the category-specific threshold.

In another example, the systems and methods described herein may use a quantile-based method to automatically set thresholds for categories. For example, for every image in the image library with a given category, the systems described herein may find the nearest neighbor with the same category and calculate the distance between the image and its nearest same-labeled neighbor. These systems may then order all of the nearest neighbor calculations made for the given category and determine a value for the nearest neighbor calculations at a specific percentile (e.g., 0.9). These systems may use the nearest neighbor distance at this percentile as the threshold for that category.

Thus, for example, for any two images $\sigma_{ci}$, $\sigma_{cj}$ in category c, c=1, 2, 3, . . . , C, these systems may calculate their distance $d_{\sigma_{ci},\sigma_{cj}}$, i≠j. These systems may then arrange the calculated distances in order as shown in Equation (3):

$$d^{(1)}_{\sigma_{ci},\sigma_{cj}}, d^{(2)}_{\sigma_{ci},\sigma_{cj}}, d^{(2)}_{\sigma_{ci},\sigma_{cj}}, \ldots , d^{\left(\frac{n_c(n_c-1)}{2}\right)}_{\sigma_{ci},\sigma_{cj}} \quad (3)$$

where $n_c$ represents the number of pictures in the image library for category c, and take the q quantile as shown in Equation (4):

$$d^{\left(\frac{n_c(n_c-1)}{2}\frac{q}{100}\right)}_{\sigma_{ci},\sigma_{cj}} \quad (4)$$

as the matching threshold for category c.

Figure 5:
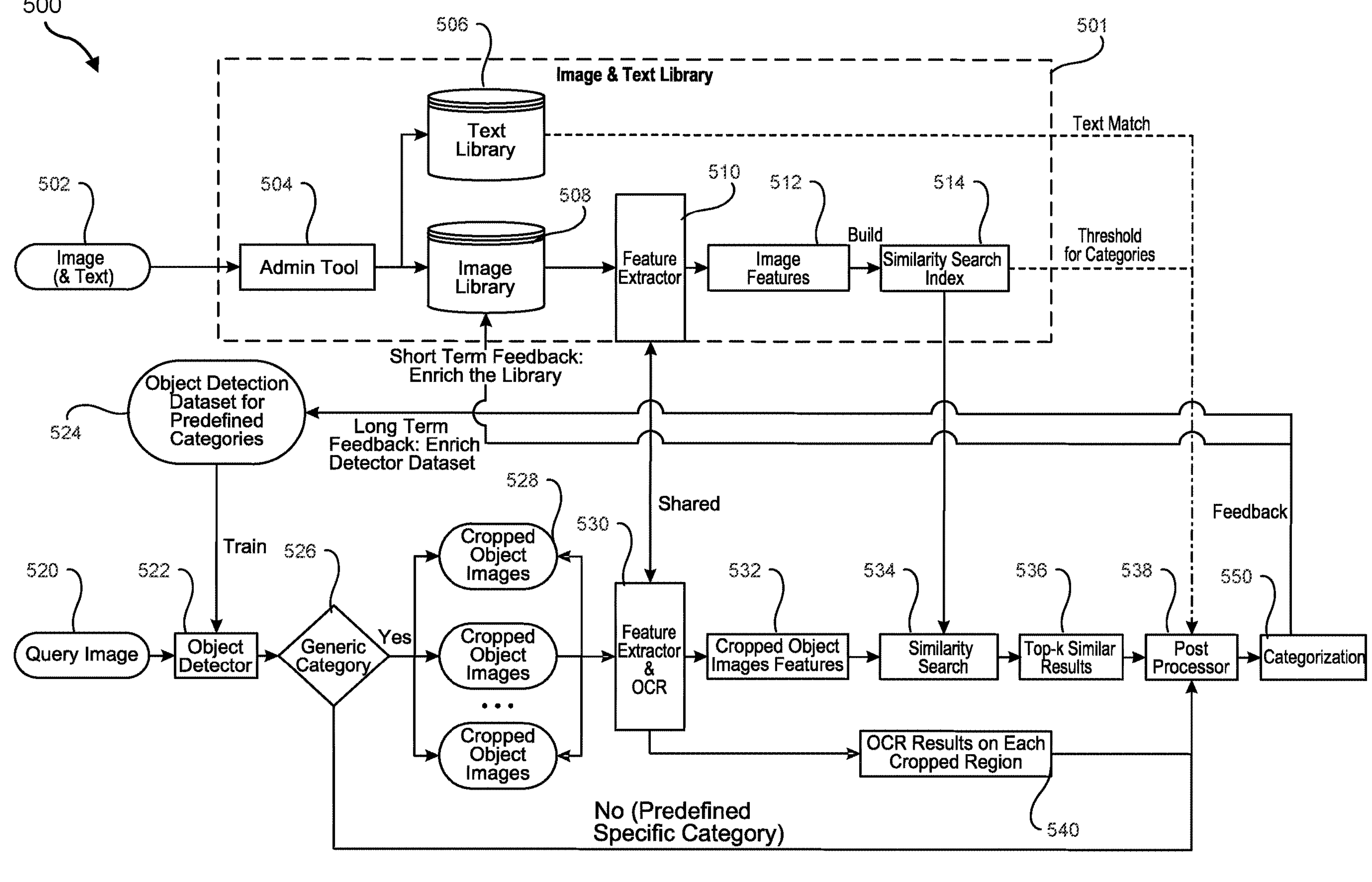
FIG. 5 is an illustration of an example system for similarity-based object detection for joint identification.

FIG. 5 is an illustration of an example system 500 for similarity-based object detection for joint identification. As shown in FIG. 5, system 500 may take a query image 520 as input and produce a categorization 550 as output.

In some examples, system 500 may first provide query image 520 as input to an object detector 522. Object detector 522 may include a pretrained machine learning model trained (e.g., by one or more of the systems described herein) on a corpus of image objects (e.g., symbols), at least some of which objects may have been labeled with specific categories. For system 500 may train object detector 522 using an object detection dataset 524. In addition, although the corpus of symbols may be only partially labeled with specific categories, the pretrained machine learning model may also be trained to identify image objects belonging to a generic category (e.g., all symbols that do not pertain to a specific category of symbols recognized by object detector 522).

System 500 may receive an initial categorization from object detector 522. If the categorization is a predefined specific category, the categorization result may proceed to a post processor 538. Otherwise, if the categorization is a generic category, system 500 may provide one or more cropped object images 528 (e.g., detected as generic objects/symbols within query image 520) to a feature extractor 530 (that may include an OCR module), which may extract cropped object images features 532 from each of cropped object images 528 as feature vectors and may also extract text from one or more of images 528, resulting in OCR results 540.

As will be discussed in greater detail below, system 500 may also include an update subsystem 501. System 500 may perform a similarity search 534 for cropped object images features 532 using a similarity search index 514 built within update subsystem 501. Similarity search 534 may yield various results, and system 500 may identify the top k similar results 536. System 500 may then pass the top k similar results 536, along with category-specific thresholds and any text match information from update subsystem 501 to a post processor 538. Post processor 538 may filter out some of top k similar results based on the similarity of the results not meeting one or more category-specific thresholds. In addition, post processor 538 may promote one or more results based on identified matching text (e.g., using OCR results 540 and text from text library 506). In some examples, post processor 538 may select a specific category for one or more of cropped object images 528 based at least in part on the top k similar results 536. Post processor 538 may thus produce a categorization 550 as output, which may include a specific category label and, in some examples, a corresponding bounding box that matches one of cropped object images 528.

System 500 may use categorization 550 as output. In addition, in some examples, system 500 may use categorization 550 as feedback to improve system 500 for future queries. In some examples, system 500 may use categorization 550 as feedback in response to the similarity result that led to categorization 550 exceeding a threshold (e.g., beyond that required to make the categorization). As an example of using categorization 550 as feedback, system 500 may add categorization 550 to object detection dataset 524 (e.g., such that, when system 500 retrains object detector 522, categorization 550 will be included in the training data to form at least a part of the basis for a new predefined specific category). As another example of using categorization 550 as feedback, system 500 may add categorization 550 to a gallery image library 508, which will be discussed in greater detail below.

As discussed above, system 500 may not rely only on object detector 522 to detect specific categories of objects. E.g., because object detector 522 may only be periodically trained at relatively long intervals, system 500 may use an update subsystem 501 to allow for updates to system 500 more frequent than the retraining of object detector 522. As shown in FIG. 5, an image 502 (or, optionally, text) may be provided to an administration tool 504. Administration tool 504 may ingest new images (and their categories) into update subsystem 501. In some examples, administration tool 504 may include a user interface for a user to manually enter new symbols (with their categorizations) into image library 508 (and, in some examples, to enter new text into a text library 506). In some examples, administration tool 504 may allow for an automated or semi-automated ingestion of images and/or text with categories. Update subsystem 501 may also include a feature extractor 510. In some examples, feature extractor 510 may be the same as or similar to feature extractor 530 (e.g., feature extractors 510 and 530 may be the same component shared by the different flows pictured in FIG. 5). Feature extractor 510 may extract image features 512 for each image in image library 508. Using image features 512, update subsystem 501 may build a similarity search index 514 (e.g., to be used on demand for a similarity search 534). Similarity search index 514 may also provide a basis for setting category-specific thresholds, to be used by post processor 538. In some examples, system 500 may update and/or rebuild similarity search index 514 when a new image is added to image library 508 (and may, e.g., recompute one or more similarity thresholds, such as a similarity threshold for the specific category to which the image belongs).

As may be appreciated, system 500 may detect specific known symbols using an efficient and powerful object detector 522, while also all detecting symbols not known (or, for some other reason, not incorporated into the training of object detector 522) at the time that system 500 last trained object detector 522 with a technically simple process of adding new examples of new symbols to image library 508 (and, e.g., text corresponding to some such symbols into text library 506). System 500 may thereby avoid needing to frequently retrain object detector 522 or require highly skilled supervision in building similarity search index 514.

Figure 6:
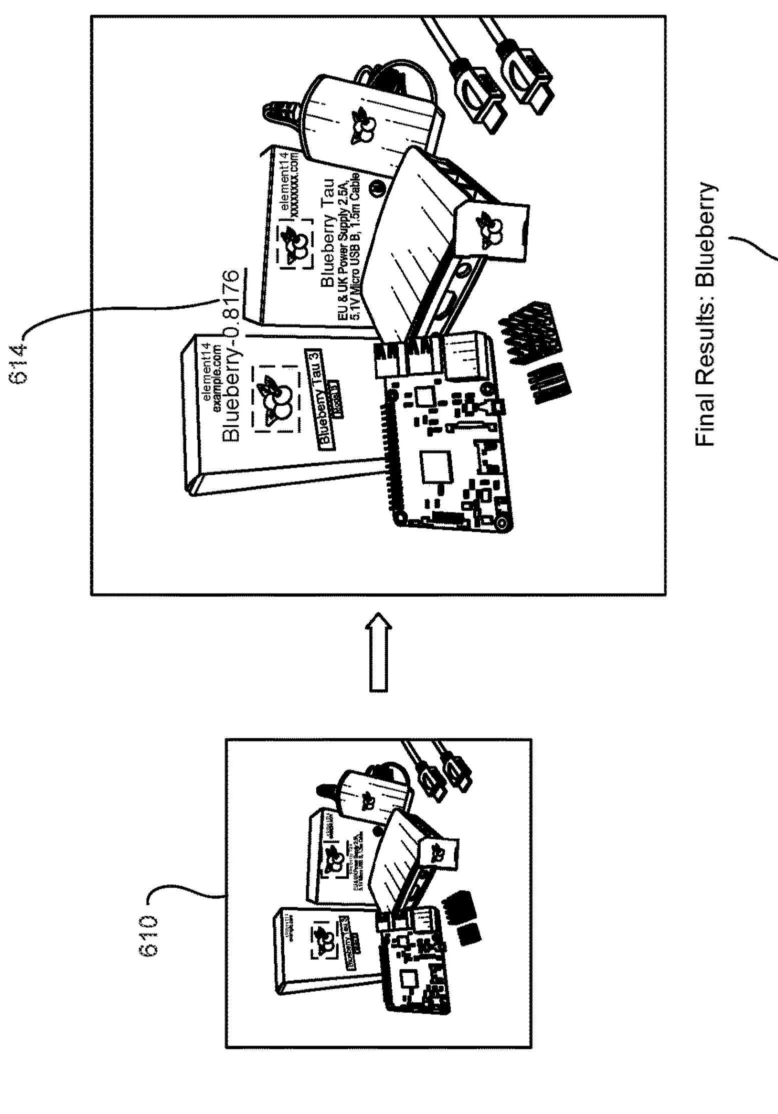
FIG. 6 is an illustration of an example application of similarity-based object detection for joint identification.
Figure 6:
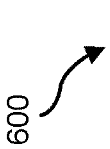

FIG. 6 is an illustration of an example application 600 of similarity-based object detection for joint identification. As shown in FIG. 6, a logo 602 may be added to a logo library 606 in association with a category label 604. Later, systems described herein may take as input an image 610 including a product with the logo 602 and detect an instance 614 of logo 602 within image 610, resulting in a categorization 616 (to apply, e.g., to image 610).

Figure 7:
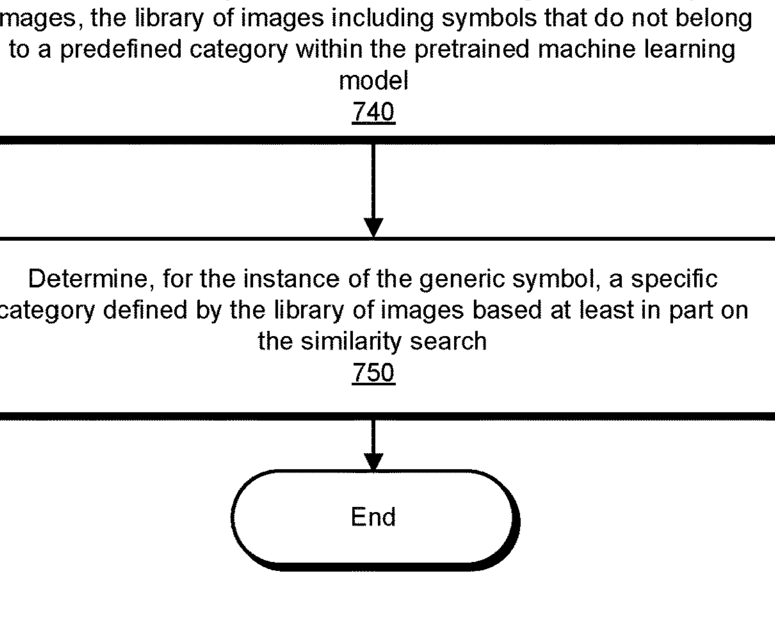
FIG. 7 is a flow diagram of an example method for similarity-based object detection for joint identification.

FIG. 7 is a flow diagram of an example computer-implemented method 700 for similarity-based object detection for joint identification. The steps shown in FIG. 7 may be performed by any suitable computer-executable code and/or computing system, including the system(s) illustrated in FIGS. 1, 2, and 5. In one example, each of the steps shown in FIG. 7 may represent an algorithm whose structure includes and/or is represented by multiple sub-steps.

As illustrated in FIG. 7, at step 710 one or more of the systems described herein may receive an image to analyze for potential symbols. These systems may perform step 710 in any of a variety of contexts. For example, these systems may be configured to scan a database, a website, and/or another source for images and perform step 710 for each image (or for each image that meets one or more predetermined initial requirements). In some examples, these systems may perform step 710 by receiving the image by manual input. In some examples, these systems may perform step 710 in response to receiving a notification of an issue with the image and/or with a source of the image (e.g., a content complaint).

At step 720, one or more of the systems described herein may provide the image as input to a pretrained machine learning model. In some examples, the pretrained machine learning model may have been pretrained to discriminate between different types of objects within images. For example, the pretrained machine learning model may have been trained to identify different types of symbols within images (classifying all of the variants of a symbol as that symbol). In addition, the pretrained machine learning model may have been trained to identify symbols on a generic basis (e.g., to identify parts of an image that appear to be symbols but which do not belong to a specific known category of symbol).

At step 730, one or more of the systems described herein may determine, based on output from the pretrained machine learning model, that the image includes an instance of a generic symbol. For example, the image may contain a symbol that does not correspond to any specific categories of symbol on which the pretrained machine learning model was trained, but may have the features of a symbol as the pretrained machine learning model was trained on symbols generically.

At step 740, one or more of the systems described herein may perform a similarity search between the image and a library of images, the library of images including symbols that do not belong to a predefined category within the pretrained machine learning model. Thus, for example, even after the pretrained machine learning model is trained, systems described herein may allow for the addition of examples of new types of symbols and, having generically detected the symbols as symbols using the pretrained machine learning model, may determine how similar the symbols are to those maintained in a quickly updateable library of images.

At step 750, one or more of the systems described herein may determine, for the instance of the generic symbol, a specific category defined by the library of images based at least in part on the similarity search. Thus, for example, the similarity search may return similarity scores for potential matches between the instance of the generic symbol and specific categories registered in the library of images. Based at least in part on one or more of the similarity scores, the systems described herein may determine that the instance of the generic symbol is an instance of a specific symbol (e.g., unknown to the pretrained machine learning model but known in the library of images).

Figure 8:
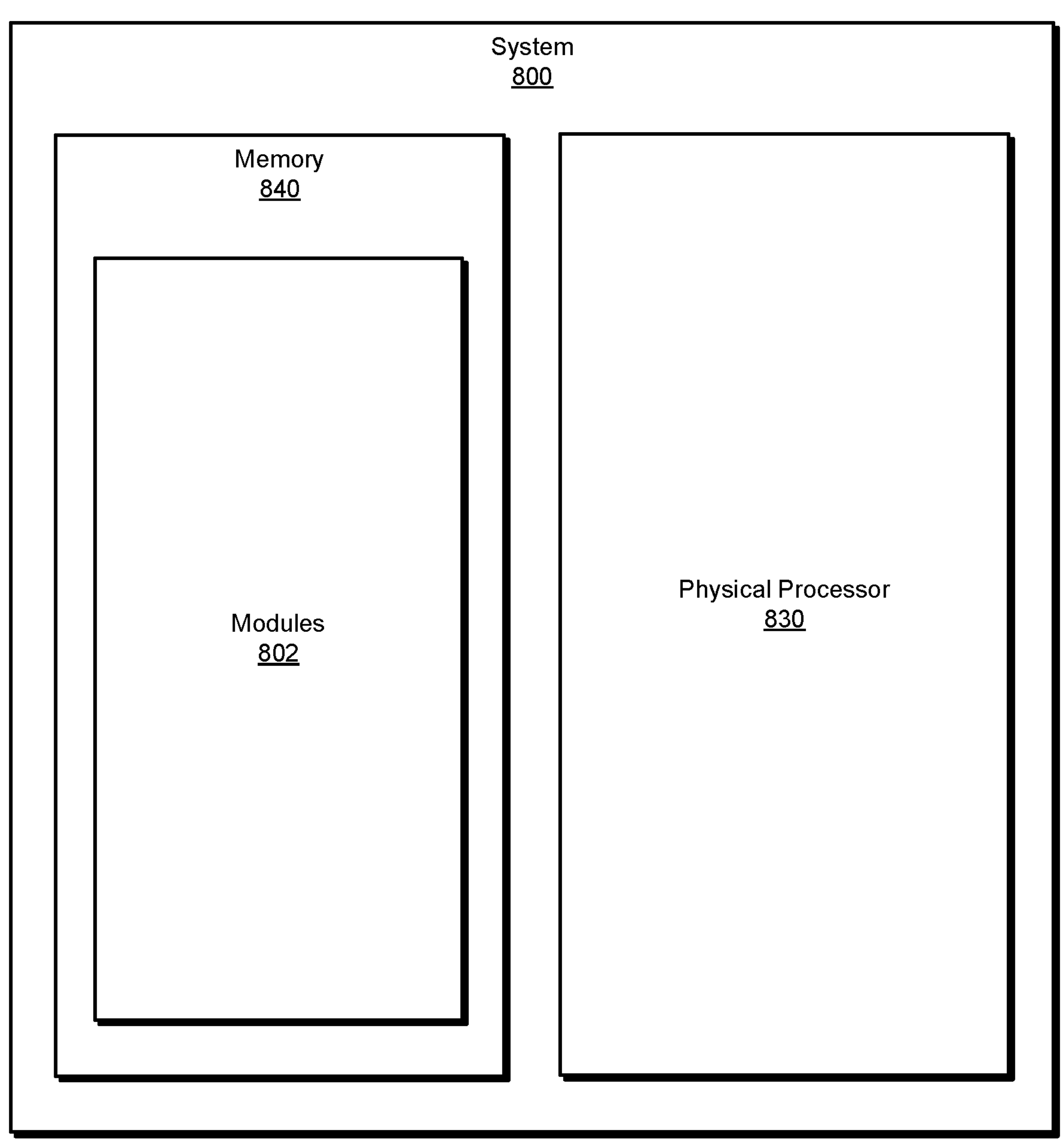
FIG. 8 is a block diagram of an example system for similarity-based object detection for joint identification.

FIG. 8 is a block diagram of an example system 800 for similarity-based object detection for joint identification. As illustrated in this figure, example system 800 can include one or more modules 802 for performing one or more tasks. In some examples, one or more portions of one or more of the steps described herein may be implemented by one or more of modules 802. Although sometimes discussed as separate elements, one or more of modules 802 in FIG. 8 can represent portions of a single module or application.

In certain implementations, one or more of modules 802 in FIG. 8 can represent one or more software applications or programs that, when executed by a computing device, can cause the computing device to perform one or more tasks. For example, and as will be described in greater detail below, one or more of modules 802 can represent modules stored and configured to run on one or more computing devices. One or more of modules 802 in FIG. 8 can also represent all or portions of one or more special-purpose computers and/or special-purpose circuitry configured to perform one or more tasks.

As illustrated in FIG. 8, example system 800 can also include one or more memory devices, such as memory 840. Memory 840 generally represents any type or form of volatile or non-volatile storage device or medium capable of storing data and/or computer-readable instructions. In one example, memory 840 can store, load, and/or maintain one or more of module 802. Examples of memory 840 include, without limitation, Random Access Memory (RAM), Read Only Memory (ROM), flash memory, Hard Disk Drives (HDDs), Solid-State Drives (SSDs), optical disk drives, caches, variations or combinations of one or more of the same, or any other suitable storage memory.

As illustrated in FIG. 8, example system 800 can also include one or more physical processors, such as physical processor 830. Physical processor 830 generally represents any type or form of hardware-implemented processing unit capable of interpreting and/or executing computer-readable instructions. In one example, physical processor 830 can access and/or modify one or more of modules 802 stored in memory 840. Additionally or alternatively, physical processor 830 can execute one or more of modules 802 to facilitate similarity-based universal object detection for joint identification. Examples of physical processor 830 include, without limitation, microprocessors, microcontrollers, Central Processing Units (CPUs), Field-Programmable Gate Arrays (FPGAs) that implement softcore processors, Application-Specific Integrated Circuits (ASICs), portions of one or more of the same, variations or combinations of one or more of the same, or any other suitable physical processor.

Many other devices or subsystems can be connected to system 800 in FIG. 8. Conversely, all of the components and devices illustrated in FIG. 8 need not be present to practice the implementations described and/or illustrated herein. The devices and subsystems referenced above can also be interconnected in different ways from those described above. System 800 can also employ any number of software, firmware, and/or hardware configurations. For example, one or more of the example implementations disclosed herein can be encoded as a computer program (also referred to as computer software, software applications, computer-readable instructions, and/or computer control logic) on a computer-readable medium. In some examples, one or more of modules 802 may be implemented in whole or in part as integrated circuits.

As detailed above, the computing devices and systems described and/or illustrated herein broadly represent any type or form of computing device or system capable of executing computer-readable instructions, such as those contained within the modules described herein. In their most basic configuration, these computing device(s) may each include at least one memory device and at least one physical processor.

In some examples, the term "memory device" generally refers to any type or form of volatile or non-volatile storage device or medium capable of storing data and/or computer-readable instructions. In one example, a memory device may store, load, and/or maintain one or more of the modules described herein. Examples of memory devices include, without limitation, Random Access Memory (RAM), Read Only Memory (ROM), flash memory, Hard Disk Drives (HDDs), Solid-State Drives (SSDs), optical disk drives, caches, variations or combinations of one or more of the same, or any other suitable storage memory.

In some examples, the term "physical processor" generally refers to any type or form of hardware-implemented processing unit capable of interpreting and/or executing computer-readable instructions. In one example, a physical processor may access and/or modify one or more modules stored in the above-described memory device. Examples of physical processors include, without limitation, microprocessors, microcontrollers, Central Processing Units (CPUs), Field-Programmable Gate Arrays (FPGAs) that implement softcore processors, Application-Specific Integrated Circuits (ASICs), portions of one or more of the same, variations or combinations of one or more of the same, or any other suitable physical processor.

Although illustrated as separate elements, the modules described and/or illustrated herein may represent portions of a single module or application. In addition, in certain embodiments one or more of these modules may represent one or more software applications or programs that, when executed by a computing device, may cause the computing device to perform one or more tasks. For example, one or more of the modules described and/or illustrated herein may represent modules stored and configured to run on one or more of the computing devices or systems described and/or illustrated herein. One or more of these modules may also represent all or portions of one or more special-purpose computers configured to perform one or more tasks.

In addition, one or more of the modules described herein may transform data, physical devices, and/or representations of physical devices from one form to another. Additionally or alternatively, one or more of the modules recited herein may transform a processor, volatile memory, non-volatile memory, and/or any other portion of a physical computing device from one form to another by executing on the computing device, storing data on the computing device, and/or otherwise interacting with the computing device.

In some embodiments, the term "computer-readable medium" generally refers to any form of device, carrier, or medium capable of storing or carrying computer-readable instructions. Examples of computer-readable media include, without limitation, transmission-type media, such as carrier waves, and non-transitory-type media, such as magnetic-storage media (e.g., hard disk drives, tape drives, and floppy disks), optical-storage media (e.g., Compact Disks (CDs), Digital Video Disks (DVDs), and BLU-RAY disks), electronic-storage media (e.g., solid-state drives and flash media), and other distribution systems.

The process parameters and sequence of the steps described and/or illustrated herein are given by way of example only and can be varied as desired. For example, while the steps illustrated and/or described herein may be shown or discussed in a particular order, these steps do not necessarily need to be performed in the order illustrated or discussed. The various exemplary methods described and/or illustrated herein may also omit one or more of the steps described or illustrated herein or include additional steps in addition to those disclosed.

The preceding description has been provided to enable others skilled in the art to best utilize various aspects of the exemplary embodiments disclosed herein. This exemplary description is not intended to be exhaustive or to be limited to any precise form disclosed. Many modifications and variations are possible without departing from the spirit and scope of the present disclosure. The embodiments disclosed herein should be considered in all respects illustrative and not restrictive. Reference should be made to the appended claims and their equivalents in determining the scope of the present disclosure.

Unless otherwise noted, the terms "connected to" and "coupled to" (and their derivatives), as used in the specification and claims, are to be construed as permitting both direct and indirect (i.e., via other elements or components) connection. In addition, the terms "a" or "an," as used in the specification and claims, are to be construed as meaning "at least one of." Finally, for ease of use, the terms "including" and "having" (and their derivatives), as used in the specification and claims, are interchangeable with and have the same meaning as the word "comprising."

What is claimed is:

1. A computer-implemented method comprising:
receiving, by a computing system, an image to analyze for potential objects;
providing, by the computing system, the image as input to a pretrained machine learning model, wherein the pretrained machine learning model is trained to detect at least one of:
a known object that corresponds to a predefined category within the pretrained machine learning model; or
a generic object that does not correspond to a predefined category within the pretrained machine learning model;
determining, by the computing system, based on output from the pretrained machine learning model, that the image comprises an instance of a generic object;
performing, by the computing system and based on determining that the image comprises an instance of a generic object, a similarity search between the image and a library of images, the library of images comprising objects that do not belong to a predefined category within the pretrained machine learning model;
determining, by the computing system and for the instance of the generic object, a specific category defined by the library of images based at least in part on the similarity search; and
training, by the computing system, the pretrained machine learning model on a corpus of objects, wherein:
the corpus of objects is partially labeled with specific categories; and
training the machine learning model comprises training the machine learning model to detect objects that are not labeled as belonging to a generic category that comprises the specific categories.

2. The computer-implemented method of claim 1, further comprising:
receiving, by the computing system, an additional image to analyze for potential objects;
providing, by the computing system, the image as input to the pretrained machine learning model; and
determining, by the computing system, based on output from the pretrained machine learning model, that the image comprises an instance of an object within a predefined category within the pretrained machine learning model.

3. The computer-implemented method of claim 1, wherein the computing system performs the similarity search that includes at least one image added to the library of images after a training of the pretrained machine learning model.

4. The computer-implemented method of claim 1,
wherein the library of images further comprises at least one text label associated with at least one of the images within the library of images;
further comprising extracting, by the computing system, associated text from the image to analyze using optical character recognition;
wherein identifying, by the computing system, the specific category of object within the image is further based at least in part identifying a match between the associated text from the image to analyze and the at least one text label.

5. The computer-implemented method of claim 1, further comprising setting, by the computing system, a similarity threshold for the category defined by the library of images, wherein performing the similarity search comprises determining whether the image falls within the similarity threshold for the category.

6. The computer-implemented method of claim 5, further comprising setting, by the computing system, an additional similarity threshold for an additional category defined by the library of images, wherein the similarity threshold and the additional similarity threshold are different.

7. The computer-implemented method of claim 5, further comprising recomputing, by the computing system, the similarity threshold for the category after a new image is added to the library of images.

8. The computer-implemented method of claim 5, wherein setting the similarity threshold for the category comprises:
identifying, by the computing system, a subset of images within the library of images that belong to the category;
calculating, by the computing system, a graph connectivity for a subgraph corresponding to the subset of images, the graph connectivity indicating a proportion of the subset of images that are connected within the subgraph when using a connectivity threshold equal to the similarity threshold; and
selecting, by the computing system, the similarity threshold based at least in part on the graph connectivity for the subgraph exceeding a predetermined threshold.

9. The computer-implemented method of claim 5, wherein setting the similarity threshold for the category comprises:
identifying, by the computing system, a subset of images within the library of images that belong to the category;
calculating, by the computing system, for each image within the subset of images, a distance to a nearest neighbor within the subset of images, thereby generating a set of distances; and
selecting, by the computing system, the similarity threshold based on a set percentile distance from the set of distances.

10. The computer-implemented method of claim 1, further comprising retraining, by the computing system, the pretrained model to include at least one image from the library of images corresponding to the category defined by the library of images.

11. The computer-implemented method of claim 10, further comprising removing the at least one image from the library of images upon retraining the pretrained model.

12. The computer-implemented method of claim 1, further comprising adding, by the computing system, the image to the library of images based at least in part on a result of the similarity search.

13. The computer-implemented method of claim 1, wherein the library of images comprises a library of logo images.

14. The computer-implemented method of claim 13,
wherein identifying the instance of an object comprises identifying, by the computing system, a logo associated with a brand;
further comprising labeling, by the computing system, a source of the logo image with an identifier of the brand.

15. The computer-implemented method of claim 1, wherein:
the library of images comprises a library of sensitive images subject to moderation; and
wherein identifying the instance of an object comprises determining, by the computing system, that the image is subject to moderation;
further comprising tagging, by the computing system, a source of the image as subject to moderation.

16. The computer-implemented method of claim 1, wherein the category defined by the library of images comprises instances of an object with a plurality of designs.

17. A system comprising:
a processor; and
a memory having stored thereon instructions that are executable by the processor to cause the system to perform operations comprising:
periodically training, by the system, a machine learning model for classifying images as containing at least one of a predefined object or a generic object on a corpus of objects, wherein:
the corpus of objects is partially labeled with specific categories; and
training the machine learning model comprises training the machine learning model to detect objects that are not labeled as belonging to a generic category that comprises the specific categories;
receiving live updates, by the system, to a library of images of objects that have not been incorporated into the periodic training of the machine learning model;
receiving, by the system, a plurality of images subject to classification;
classifying, by the system, a first portion of the plurality of images as containing a predefined object;
classifying, by the system, a second portion of the plurality of images as containing a generic object; and
matching, for the second portion of the plurality of images, each image within the plurality of images to one or more images within the library of images.

18. The system of claim 17, wherein periodically retraining the machine learning model comprises periodically including images from the library of images that had not previously been used in training the machine learning model into the retraining of the machine learning model.

19. A computer-implemented method comprising:
receiving, by a computing system, an image to categorize;
providing, by the computing system, the image as input to a pretrained machine learning model;
determining, by the computing system, based on output from the pretrained machine learning model, that the image corresponds to a generic category;
performing, by the computing system and based on determining that the image corresponds to a generic category, a similarity search between the image and a library of images; and
categorizing, by the computing system, the image based at least in part on the similarity search; and
training, by the computing system, the pretrained machine learning model on a corpus of objects, wherein:
the corpus of objects is partially labeled with specific categories; and
training the machine learning model comprises training the machine learning model to detect objects that are not labeled as belonging to a generic category that comprises the specific categories.

* * * * *